United States Patent
Yang et al.

(10) Patent No.: US 8,200,766 B2
(45) Date of Patent: Jun. 12, 2012

(54) SOCIAL NETWORKING RUNTIME

(75) Inventors: Ning Yang, Beijing (CN); Kui Fei Yu, Beijing (CN); Li Han, Beijing (CN); Jyri Salomaa, Espoo (FI)

(73) Assignee: Nokia Corporation, Espoo (FI)

( * ) Notice: Subject to any disclaimer, the term of this patent is extended or adjusted under 35 U.S.C. 154(b) by 210 days.

(21) Appl. No.: 12/359,923

(22) Filed: Jan. 26, 2009

(65) Prior Publication Data

US 2010/0191811 A1    Jul. 29, 2010

(51) Int. Cl.
*G06F 15/177* (2006.01)
(52) U.S. Cl. ........................ 709/206; 709/220
(58) Field of Classification Search .......... 709/204–206, 709/245, 220–222; 715/751–759; 434/350–351
See application file for complete search history.

(56) References Cited

U.S. PATENT DOCUMENTS

| | | | |
|---|---|---|---|
| 6,418,330 | B1 | 7/2002 | Lee |
| 7,103,391 | B2 | 9/2006 | Chan |
| 7,610,044 | B2 * | 10/2009 | Sindoni ............... 455/414.1 |
| 2003/0046401 | A1 | 3/2003 | Abbott |
| 2004/0213401 | A1 | 10/2004 | Aupperle et al. |
| 2006/0101446 | A1 | 5/2006 | Mariani et al. |
| 2006/0200439 | A1 | 9/2006 | Bhatia et al. |
| 2006/0265662 | A1 | 11/2006 | Gertzen |
| 2007/0112938 | A1 * | 5/2007 | Belimpasakis ............ 709/219 |
| 2007/0201685 | A1 * | 8/2007 | Sindoni ............... 379/373.02 |
| 2007/0233736 | A1 | 10/2007 | Xiong et al. |
| 2007/0258396 | A1 * | 11/2007 | Tiraspolsky ............ 370/328 |
| 2008/0307043 | A1 | 12/2008 | Dorsey et al. |
| 2009/0070412 | A1 | 3/2009 | D'Angelo |
| 2009/0286518 | A1 * | 11/2009 | Sindoni ............... 455/414.1 |
| 2010/0058220 | A1 * | 3/2010 | Carpenter ................ 715/772 |
| 2010/0158216 | A1 * | 6/2010 | Sindoni ................ 379/88.17 |

FOREIGN PATENT DOCUMENTS

| | | |
|---|---|---|
| WO | WO 01/16765 A1 | 3/2001 |
| WO | 2008047207 A2 | 4/2008 |

OTHER PUBLICATIONS

Java Virtual Machine, downloaded Nov. 26, 2008, 5 pages.
Runtime, downloaded Nov. 26, 2008, 2 pages.
SMIL: Markup for Multimedia.(Internet/Web/Online Service Information), Article from Macworld, dated Feb. 1, 2000 authored by Jim Heid, downloaded Dec. 18, 2008, 5 pages.
Forum. Nokia.com, downloaded Nov. 25, 2008, 19 pages.
Synchronized Multimedia Integration Lanaguage (SMIL 2.0)—[Second Edition], downloaded Jan. 14, 2009, 407 pages.
Helix Community—The Foundation of Great Multimedia Applications; downloaded Jan. 8, 2009, 1 page.
Adobe Flash Lite 3 Developer Edition, downloaded Jan. 8, 2009, 2 pages.
Python for S60 From Open Source, downloaded Jan. 8, 2009, 4 pages.

* cited by examiner

*Primary Examiner* — Kenneth R Coulter
(74) *Attorney, Agent, or Firm* — Ditthavong Mori & Steiner, P.C.

(57) ABSTRACT

Provided are apparatuses and methods for social networking applications and services. New applications and services based on a common runtime may be developed. Such applications and services may allow scripts to be loaded and interpreted. Furthermore, dynamic links generated by the scripts may be sent to an application engine for execution. The dynamic links may also be sent (e.g., shared) with other devices and/or users in a social networking environment.

20 Claims, 3 Drawing Sheets

SOCIAL NETWORKING RUNTIME

RELATED APPLICATION

This application is related to pending U.S. patent application Ser. No. 12/079,191, entitled "APPARATUS, METHODS, AND COMPUTER PROGRAM PRODUCT PROVIDING IMPROVED APPLICATION DEVELOPMENT FOR ELECTRONIC DEVICES," filed Mar. 24, 2008, which is herein incorporated by reference in its entirety.

FIELD OF THE INVENTION

The invention relates generally to social networking applications and services. More specifically, the invention relates to developing new applications and services based on a common runtime.

BACKGROUND

Online social networking and communication services have become new forums for people to converse, socialize, and do business remotely without the need for face-to-face meetings. Mobile communication technology has also furthered ways in which individuals socialize by enabling communication while on the go. Such services and technologies provide users with instantaneous and continuous access to any other user or to any number of users simultaneously. However, these new means of remote communication often lack many of the social cues one gets when individuals are communicating in the same place. Various methods have come about that, to some extent, help make up for the lack of social cues. One such method is to exchange between individuals, or to publish on social communication networks, presence and activity information of the individuals. As an example, such information may inform others about the level of activity and attentiveness of an individual in a social communication network or about an individual's current availability to converse.

Furthermore, numerous APIs exist in the social networking industry. For example, Google's OpenSocial API provides a common API for social applications across multiple Internet websites. Facebook also provides developers with an API that enables them to add social context to applications by utilizing profiles, friends, photos, and event data. Meanwhile, Google's Data APIs attempts to provides a simple standard protocol for reading and writing data on the web.

In addition, web systems are already known that allow sharing of data between applications on different Internet websites. For example, Microsoft .NET Passport technology allows different websites to take advantage of Microsoft's Passport technology to authenticate users without having to store and maintain a user's authentication information on its own servers. Microsoft .NET allows different websites to access Microsoft .NET web services to perform a particular function.

Software virtual machines are also well known. Sun Microsystems developed the JAVA™ programming language that operates on a virtual machine architecture. In such languages, the programming code (i.e., bytecode) is submitted to an interpreter that reads and compiles the bytecode into native code that can be run on the machine's processor.

Nevertheless, while the aforementioned APIs and technologies assist developers in creating web applications and users in enjoying them. In web applications, the data is only a part of its own runtime environment. Every web application takes care of its own runtime, and there is no concept of a common runtime to develop new richer multiple communication applications. Therefore, there exists a need for a method, apparatus, and system for addressing at least one or more of these shortcomings.

BRIEF SUMMARY

The following presents a simplified summary of aspects of the invention in order to provide a basic understanding of some aspects of the invention. This summary is not an extensive overview, and is not intended to identify key or critical elements or to delineate the scope of the claims. The following summary merely presents some concepts and aspects in a simplified form as a prelude to the more detailed description provided below.

To overcome limitations in the prior art described above, and to overcome other limitations that will be apparent upon reading and understanding the present specification, aspects of the present disclosure are directed to apparatuses, systems, and methods for social networking applications and services. New applications and services based on a common runtime may be developed. Such applications and services may comprise a program script and a user interface (UI) script. After the appropriate script is loaded, the appropriate elements of the script may be interpreted upon the appropriate triggering event or action. Furthermore, dynamic links (e.g., a call log item) generated by the program script and other related components of the service may be distributed to other devices with a common runtime (e.g., social networking environment) for use when executing, among other things, UI scripts on their application engines. One skilled in the art will appreciate that numerous steps may be involved in the generation and distribution of dynamic links, and execution of UI scripts based on these dynamic links.

Examples of social events in accordance with various aspects of the invention include, but are not limited to, incoming calls on a mobile device, photos taken together through camera on a mobile device, downloading shared landmarks, calendar events of friends, etc. One skilled in the art will appreciate after review of the entirety disclosed herein that various aspects of the disclosure may be used alone or in combination with each other.

In another example, a tangible computer-readable medium containing executable code is provided for performing methods disclosed herein. Also, the computer-readable medium may be implemented on any device disclosed herein. The devices may include, but are not limited to, circuitry for a global positioning satellite receiver and a media player component.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

In the following description, reference is made to the accompanying drawings, which form a part hereof, and in which is shown by way of illustration various features that may be used. It is to be understood that other embodiments may be utilized and structural and functional modifications may be made without departing from the scope and spirit of the present application.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
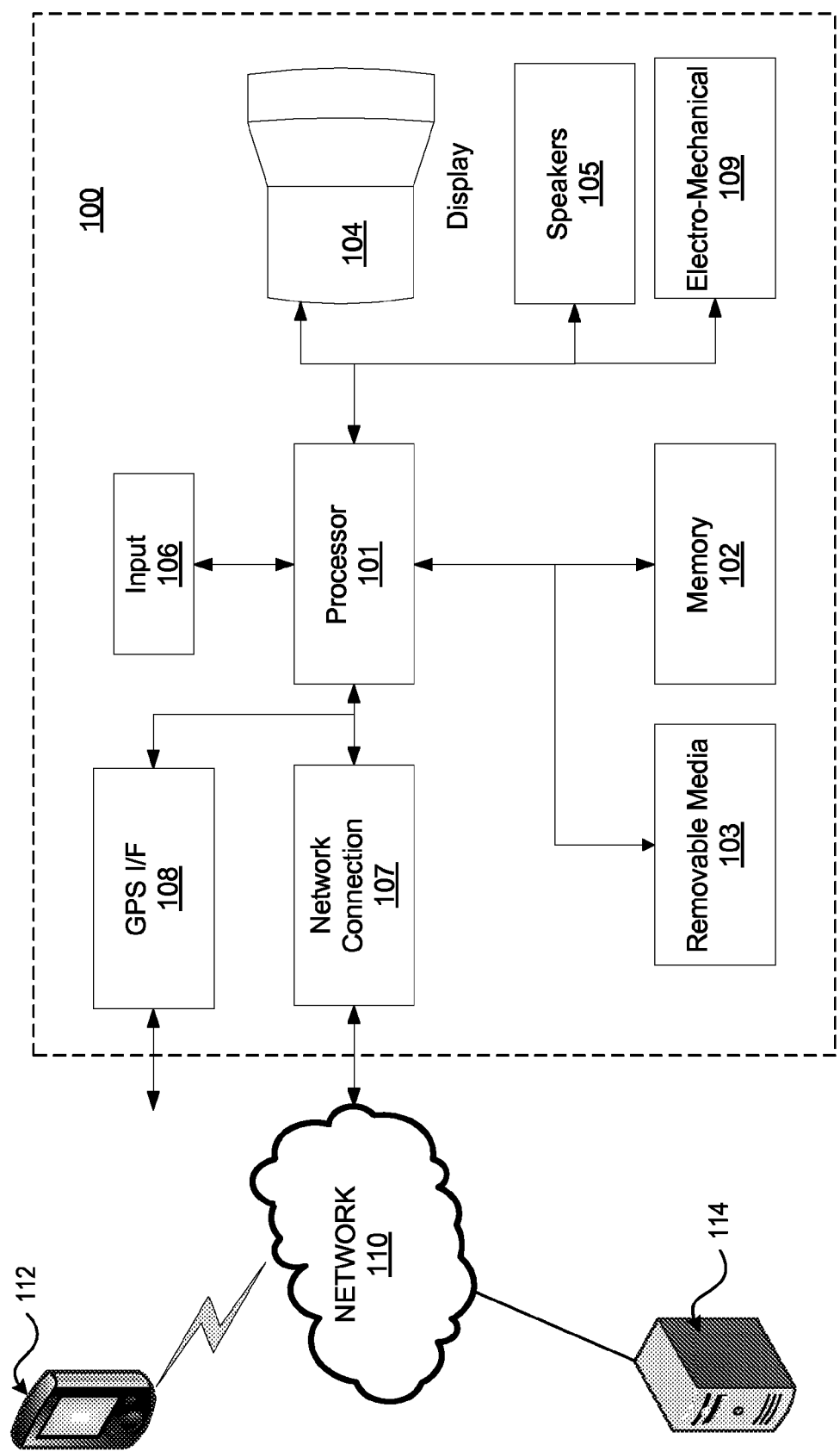
FIG. 1 illustrates basic components of a computing system on which features described herein may be implemented.

FIG. 1 depicts an illustrative operating environment in accordance with aspects of the invention where, in one aspect, basic components of a computing system on which features described herein may be implemented. The system 100 may take the form of a general purpose computer, such as a personal computer, mainframe computer, network based server, etc. Alternatively, system 100 may be implemented as any other fixed or mobile electronic device, such as a cellular telephone, mobile communication device, personal data assistant (PDA), pager, TV device, music player, AM/FM/digital radio receiver, video player, etc.

The system 100 may have one or more processors 101, such as a programmable logic device or microcontroller, which comprise logical structure, and may optionally execute instructions, to provide features described herein. The instructions (and other data described below) may be stored as computer-readable instructions on one or more memory devices 102, which may be dynamic and/or static random access memories (RAM), read-only memories (ROM), magnetic or optical disk, or any other desired computer-readable storage device. Computer executable instructions and data used by processor 101 and other components within device 100 may be stored in a computer readable memory. The memory may be implemented with any combination of read only memory modules or random access memory modules, optionally including both volatile and nonvolatile memory. The instructions may also be computer-readable instructions received over a network 108 and through a network interface 107. The system 100 may also include one or more removable media 103 that can also store any of the data described herein (e.g., computer-readable instructions, data described below, etc.). The removable media 103 may be any desired type, such as removable FLASH memory, disk drives, optical or magnetic disks, etc. Software may be stored within memory 102 and/or storage 103 to provide instructions to processor 101 for enabling device 100 to perform various functions (e.g., media player, etc.) Alternatively, some or all of these computer executable instructions may be embodied in hardware (e.g., media MP3 player circuitry, global positioning satellite receiver circuitry, etc.) or firmware (not shown).

The system 100 may host a social communication service. A social communication service may be any communication service that a user may access through a network, such as an online chat service, webpage, bulletin board system, email server, professional or social networking service, photo sharing service, peer-to-peer service, etc. The services may provide real-time and/or non-real-time communication and the communication may be one-way or two-way between users of the services. The system 100 may also serve as a user interface to a local or remote server that provides social communication services or social communication channels. As such, the user may make requests for information about another user or may provide information about itself (e.g. location of the user) to another user who is requesting information.

The system 100 may also behave as a repository or server in which users retrieve and store information (e.g. storing a user's privacy preferences) or which performs calculations necessary for carrying out features described herein (e.g. determining the relationship between two communication services, or determining the activity of a user in a communication service). The system 100 may perform a combination of any of these functions. For example, in a peer-to-peer service, system 100 may host a communications service, serve as a user interface, serve as a repository for data, and perform the calculations necessary for carrying out features described herein. As an alternate example, the features described herein may be performed in a distributed fashion by a number of systems similar to system 100.

As a user interface, the system 100 may also include features, such as a Global Positioning System (GPS) Interface 108 or other location enabling device, to enable the determination of the user's location. To interact with the user, the system 100 may include one or more user input devices 106 and one or more output devices. The user input devices 106 may be, for example, alphanumeric push buttons on a keyboard (e.g., desktop computer keyboard, mobile telephone keypad, etc.), touch and/or capacitive-sensitive pads on a laptop, computer mouse, trackball, stylus on a sensitive input area or display, motion sensors, video camera, etc. The output devices may include video output devices 104, such as a mobile phone display (e.g., LCD display), monitor display, television, or electronic paper, which can display user interfaces of various services and programs, video, text, or other visible information to the user. The output devices may include one or more internal/external speakers 105 (e.g., headphones plugged into a mobile device), which can be used to play audio tracks, voice communications, audible cues, or other audible information for the user. The output devices may also include electromechanical devices 109 for inertial and motion feedback to the user.

The user may further interact with the system 100 remotely through the network 110 and network interface 107. Network connection 107 may be any form of computer interface. For example, a system 100 may be a computing device connected to the Internet through a wireless interface (such as WLAN, Bluetooth, WIMAX) or wired interface, and network connection 107 may include any of these elements. If system 100 is implemented in a mobile telephone, network connection 107 may include the radio-frequency (RF) wireless circuitry used to allow the phone to communicate data to and from an external cellular telephone network or satellite network. If system 100 is implemented in an audio/video player or TV device the network connection 107 may include circuitry and/or receiver used to allow the system to receive signals from analog/digital radio/video/TV networks. The network 110 to which the system 100 communicates may then be the Internet, a telephone network (e.g., mobile or public-switched), cable television, satellite, or any other desired network. The network 110 may comprise any multiple of the same or different types of networks and network connection 107 may be configured to enable communication through the multiple networks.

Moreover, computing devices 112 and 114 may interact with the system 100 remotely through the network 110 and network interface 107. The computing devices 112 and 114 may be a laptop computer, personal computer, server machine, handheld computing device (e.g., a PDA), mobile phone, or any other appropriate computing device connected to the network 112. The computing device 112 and 114 may be comprised of one or more servers and/or devices capable of communicating through the network 110 to receive and transmit data.

Figure 2:
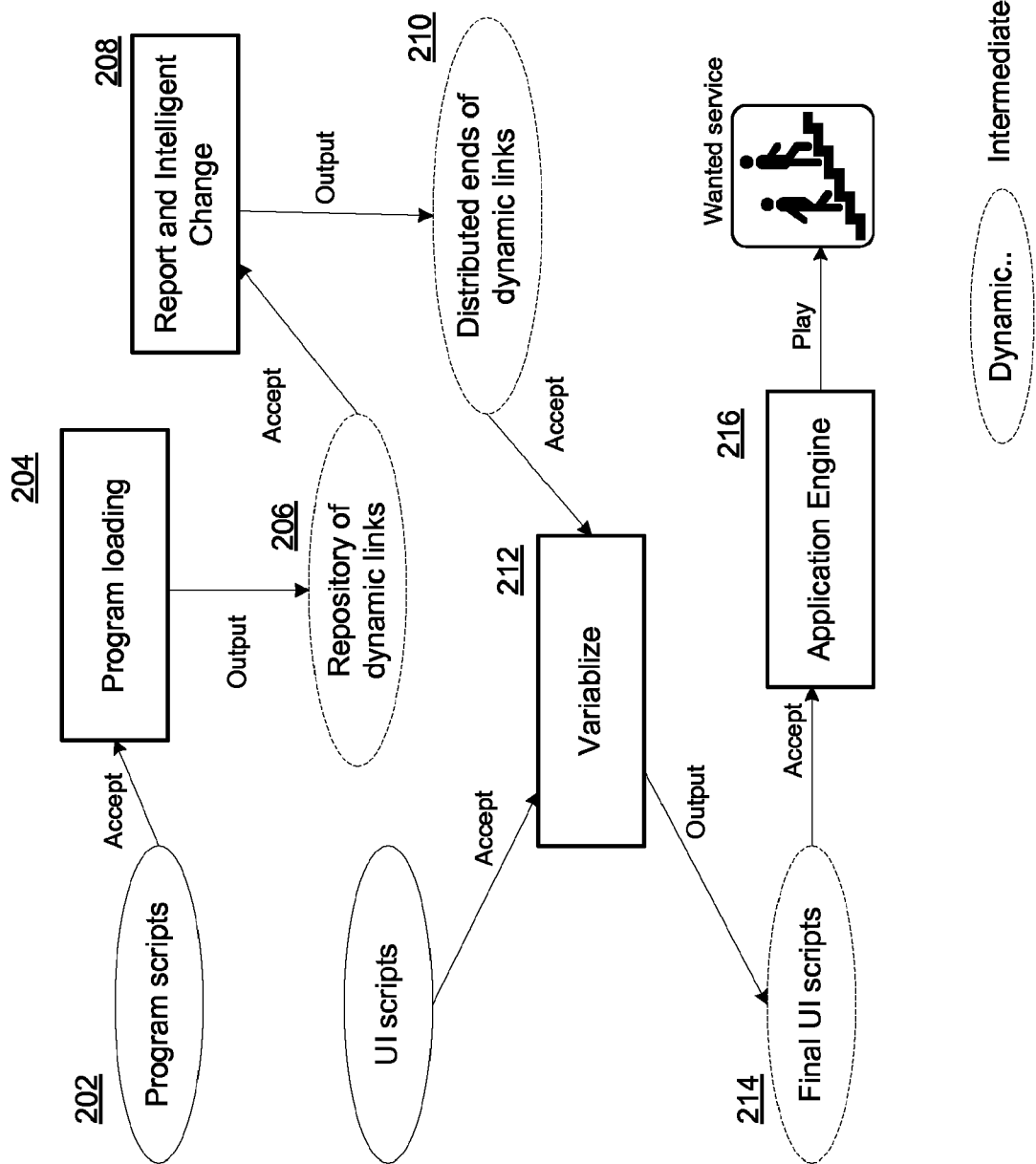
FIG. 2 illustrates a method illustrating one or more aspects of the invention.
Figure 3:
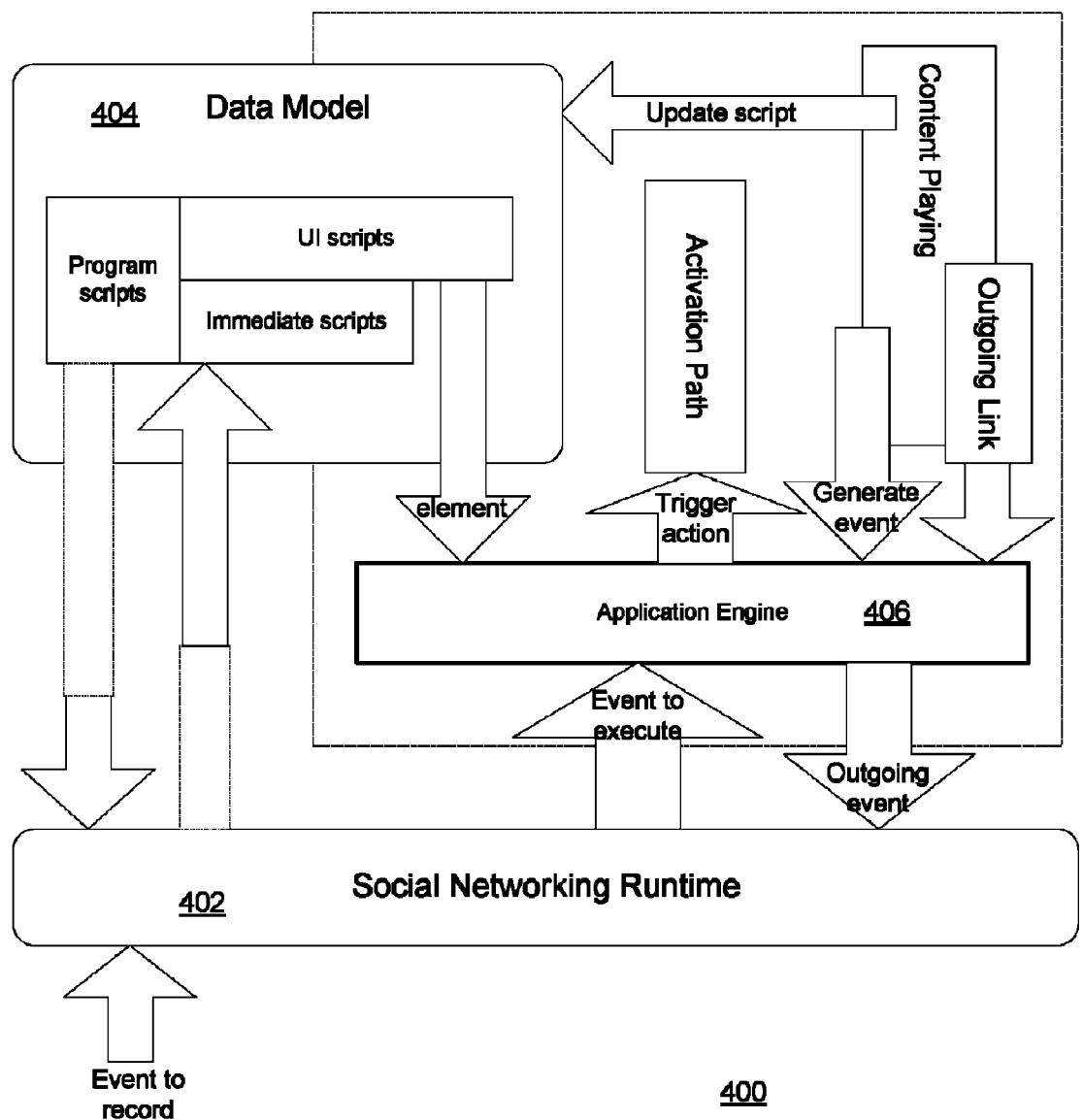
FIG. 3 is an overview architectural diagram of components in accordance with various aspects of the invention.

FIG. 2 illustrates a method illustrating one or more aspects of the invention. In particular, the method of FIG. 2 is described below based on the system overview architecture discussed in relation to FIG. 3 and FIG. 1 above. FIG. 3 is an overview architectural diagram of components 400 in device 100 in accordance with various aspects of the invention. It is understood that the method of FIG. 2 may be adapted to accommodate modifications to the architecture of FIG. 3 without departing from the scope and spirit of the instant disclosure.

In step 204, a program script 202 may be loaded into a part of a social networking runtime system 402 running in device 100. In one example, the program script may adhere to Synchronized Multimedia Integration Language (SMIL). The SMIL version 2.0 namespace is partitioned into ten functional areas that each provides some functionality. Within each functional area further partitioning is applied into modules. One skilled in the art will appreciate that although the following illustrative program script is illustrated below in SMIL, other protocols (either public or proprietary) may be used to accomplish the desired function, and the invention is not merely limited to SMIL scripting:

```
<a href="pic_repos.smil" begin="photo_taken AND
    BT_device_discovery(known_people.xml)" />
```

The above illustrative program script excerpt involves two social events that have their runtimes combined through a social networking runtime. One event is the event of the "camera" communication service on the social networking runtime where a camera on the device is used to take pictures of friends. Another is of the "Bluetooth" communication service about what known devices (e.g., of friends, colleagues, etc.) were within Bluetooth® range. The program script may be used for a social networking service that causes the device 100 to associate a dynamic link among the particular Bluetooth-devices discovered when the picture is taken by one of their users, along with image data and contextual information about the image. Therefore, in this one example, the program script generates the repository of dynamic links.

In addition, the dynamic links may be stored in a repository 206 in device 100 (e.g., memory 102 or removable media 103). Any new service with above "program script" and "UI script" installed on the device would have its UI scripts updated in step 212 based on dynamic link analysis performed on the repository of dynamic links. For example, the following element may be stored in a file (e.g., "pic_repos.smil" of the above program script's href's attribute value) in the data model 404 in device 100:

```
<img begin ="BT_found("John,Mary") AND photo_taken("Mike") AND
    2008-05-31T19:20+01:00" src="pic2008053131.jpg"/>
```

The element may provide dynamic links among "Mike", "John" and "Mary", and also the associated content (e.g., pic2008053131.jpg of src's attribute value). As a result, in one example service whose UI script is shown immediately below, when the appropriate trigger action is detected on Mike's device 100 (e.g., an incoming call from Mary), the appropriate dynamic links' associated content (from immediate.smil of href's attribute value) are shown (e.g., one or more pictures taken of Mary may be displayed on device 100 to accompany the incoming call). This UI script in data model 404 on Mike's device 100 may manage at least the execution of the one or more resulting actions.

<a href="immediate.smil" begin="incall("Mary")"/>

Furthermore, in step 208, in accordance with various aspects of the invention the "report and intelligent change" module may generate duplicate dynamic links (similar to above) and distribute to other devices 112 as the dynamic links' ends. The dynamic link may be recorded into "pic_repos.smil" per the aforementioned program script (illustrated above). The "report and intelligent change" module may perform dynamic link analysis and distribution by accepting a repository of dynamic links and outputting distributed ends of dynamic links. The module may include hardware and/or software (i.e., computer-executable program code stored on a computer-readable medium). Device 112 may be similar to device 100 in that it may also include a processor, memory, input, output, and other components displayed in FIG. 1. Device 100 may distribute the additional generated elements to devices (e.g., device 112) corresponding to a user identified as John. Some examples of the additional generated element include:

```
TO JOHN: <John-pic2008053131.smil>:
<a href="Mike:pic2008053131.smil" begin="BT_found("Mike,Mary")"
    AND 2008-05-31T19:20+01:00" />
TO MARY: <Mary-pic2008053131.smil>:
<a href="Mike:pic2008053131.smil" begin="BT_found("Mike,John")"
    AND 2008-05-31T19:20+01:00" />
```

The aforementioned elements may be configured to be distributed (in step 210) to John and Mary, respectively.

In one example in accordance with various aspects of the invention, on the device 112 corresponding to John, for example, a user interface (UI) script stored in the data model in the device 112 may be copied and modified (i.e., "variablized") according to the aforementioned elements received. The modified UI scripts for a slideshow feature may be stored in a particular portion (e.g., the immediate area) of the data model in the device 112 and be executed when the appropriate triggering event occurs. For example, in the case of user John, the UI script, before it has been "variablized" may appear as follows:

```
<img id="image_recall" src="recall.gif" />
<a href="immediate.smil" begin="image_recall.click, incall("Mary")" />
```

In particular, the aforementioned UI script and its dynamic links will be modified (i.e., "variablized") in step 212. The modified UI script (in step 214) may, in some embodiments, appear as follows:

```
<img id="image_recall" src="recall.gif" />
<a href="Mike:pic2008053131.smil" begin=" image_recall.click + 1s,
    incall("Mary")" />
```

In this example, "immediate.smil" was replaced with "Mike:pic2008053131.smil" by the "report and intelligent change" module described above. In addition, the components of the script may be processed to interpret, for example, the "begin" attribute of the script. The first begin attribute is about time in this example. Thus, the following elements in "Mike:pic2008053131.smil.":

```
<img begin="2008-05-31T19:20+01:00" src="1.jpg">
<img begin="2008-05-31T19:28+01:00" src="2.jpg">
``` would be replaced with the following elements: (assuming a 1 second interval)

```
<img begin="1s" src="1.jpg">
<img begin="2s" src="2.jpg">
```

Likewise, the "BT_found" attribute (i.e., Bluetooth® device detected) may be replaced with an "incall" attribute to signal the device 112 to recall the appropriate contextual information when receiving an incoming call (i.e., "incall") from a particular caller. In this example, during translation only those "BT_found" with "Mary" would be picked out since the trigger in UI script is "incall('Mary')."

In step 216, the final UI script may be sent to an application engine 406 for, among other things, execution. Consequently, the application engine performs the desired action of displaying a picture of the caller on the display 104 of the device 112 either during an incoming call from "Mary" or the "recall.gif" picture is clicked. In another embodiment, the picture displayed may include the caller and the recipient of the call.

In other examples in accordance with aspects of the invention, a device 100 with a common runtime for applications may use shared landmarks to provide navigation features. For example, as illustrated below, the begin attribute of program script in such an embodiment may include a "landmark('current_pos')" value (i.e., the social event of GPS landmark) and the "Data_upload" value (i.e., the data sharing's social event). As a result, all landmarks that have been uploaded near the current position are recorded using a program script. Meanwhile, the UI script may include a begin attribute with a value of "query_landmark('NameOrPicture.xml')." Thus, when a "query_landmark" event is received by device 100, the correct place is used as a destination to start navigating by using "href="landmark_navigation:immediate.smil"" to send landmark_navigation event to GPS landmark service.

An illustrative program script excerpt may appear as follows:

```
<a href="landmark_repos.smil" begin="landmark("current_pos")
AND Data_upload" />
```

And an illustrative UI script excerpt may appears as follows:

```
<a href="landmark_navigation:immediate.smil"
begin="query_landmark("NameOrPicture.xml")" />
```

In another example in accordance with aspects of the invention, a device 100 with a common runtime for applications may contain a UI script that uses the text messaging feature (e.g., SMS or other comparable feature) to automatically reply to incoming calls during particular time periods with a predetermined message to the caller. For example, the begin attribute in such an embodiment's program script may include an "incall(timeperiod.xml)" value. As a result, all incoming calls that are receiving during the time periods listed in the timeperiod.xml file are recorded. Then, through UI script excerpt as follows, those incoming calls during timeperiod.xml would be automatically replied to with an SMS message to the caller with a predetermined message (e.g., "in a meeting—call me after 10 a.m."):
    <a href="smsto:immediate.smil" begin="inCall(TimePeriod.xml)"/>

In yet another example in accordance with aspects of the invention, a device 100 with a common runtime for applications may contain a program script that records which song is (or songs were) playing on the device 100 at the time of an incoming call on the device 100:

```
<audio begin="inCall(john), 1995,9:20" src="love.mp3">
<audio begin="inCall(john), 1995,10:35" src="love.mp3">
```

By intelligently recognizing the pattern of what songs will be played on subsequent calls from that particular caller, the device 100 may use UI scripts to direct the device to play the song and/or the portion of the song as a ringtone for the caller. As such, the device 100 may be configured to set the song (or portion of the song) as the ringtone on the device 100 for when the caller calls shown as illustrated herein. For example, the begin attribute of a program script in such an embodiment may include "MediaPlaying" (i.e., the social event of media playing service) and "inCall" (i.e., the social event of call service) values. As a result, if multimedia is playing (i.e., "MediaPlaying" is TRUE) when there's an incoming call event, the context information is recorded using program scripts. Furthermore, in various embodiments, based on the historical data about what song is playing when incoming calls are received for a particular caller, the UI script may be variablized to update the ringtone on the device 100 to that song which is most frequently playing when there is an incoming call from the caller.

An illustrative program script excerpt may appear as follows:
    <a href="mus_repos.smil" begin="MediaPlaying AND inCall"/>
And an illustrative UI script excerpt may appear as follows:
    <a href="immediate.smil" begin="inCall"/>

In other examples in accordance with aspects of the invention, a device 100 with a common runtime for applications may allow reminders and appointments for events (e.g., birthdays, doctor's appointment, etc.) to be recorded. For example, the begin attribute of a program script in such an embodiment may include the "calendar(birthdayPartyInvitation.xml)" value. As a result, all invitations about events like birthday party in the calendar would be recorded. Then, when the date of the event (e.g., birthday date from party invitation) arrives, a UI script may direct the device 100 to display an image to remind the user of device 100 about the event, for example, using a social event of an alarm service on the device 100. For example, a picture of a birthday cake may be displayed as a default for all birthday party reminders. Alternatively, an image of a birthday cake may appear besides an image of the person for whom the event is relevant (e.g., today is his/her birthday). Moreover, a short greeting message may be sent to him/her. One skilled in the art will appreciate that there are many other examples and combinations possible.

In various embodiments in accordance with aspects of the invention, the underlying application programmer's interface (API) is configured to be capable of growing dynamically. The triggering social events (e.g., incall) and actions (e.g., smsto) above are analogous to executing a function call of an API. As such, as the variety of triggering events and actions grow, the API may grow dynamically.

The embodiments herein include any feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. As used herein, a "program script" may be embodied in: a software (and/or firmware) program instruction, a portion of a software (and/or firmware) program instruction, and/or a portion of a software (and/or firmware) program. The features herein also include one or more computer-readable media, storing computer-executable instructions that, when executed by a computer, cause the computer to perform the various method features recited above. The features herein also include an apparatus having a processor configured to perform the various method features recited above.

We claim:

1. A method comprising:
   determining to load a program script, involving one or more social events, into a runtime system of one or more services of a device;
   determining to generate a repository of dynamic links, and to provide contextual information and/or data, relating to the social events of the program script;
   processing the repository of dynamic links;
   determining, based on the program script, to update a user interface (UI) script of at least one of the services based at least in part on the processing of the dynamic links; and
   causing, at least in part, transmission of the modified user interface script to an application engine of the device for execution of one or more resulting actions.

2. The method of claim 1, wherein,
   the UI script comprises a script to direct the device to play a song as a ringtone for a caller;
   the social events comprise a media service and a call service on the device,
   the program script is configured to identify a song playing on the device at a time of receipt of an incoming call from the caller, and
   the UI script is updated to set the song as the ringtone on the device for the caller.

3. The method of claim 2, where the program script is configured to further consider historical data about songs playing on the mobile device at respective times of receipt of incoming calls from the caller.

4. The method of claim 1, wherein,
   the social events comprise one or more navigation functions concerning landmarks near a position of the device, and
   the UI is updated to provide information regarding one or more recorded landmarks to a navigation service of the device.

5. The method of claim 1, wherein,
   the social events comprise one or more incoming calls on the device from respective callers during a predetermined time period, and
   the UI is updated to send a predetermined message to the respective callers.

6. The method of claim 1, wherein
   the social events comprise a camera function and a device discovery function on the device,
   the program script is configured to generate a link among one or more other devices and image data, wherein the other devices are discovered via the discovery function at a time that the image is captured via the camera function, and
   the UI is updated to display the image on the device upon receipt of an incoming call from a one of the other devices.

7. The method of claim 6, wherein the image comprises a picture of a recipient of the call with the caller.

8. The method of claim 1, wherein,
   the social events comprise a reminder service for calendar events of the device and a predetermined image associated with one or more of the calendar events, and
   the UI is updated to display the image as a reminder for all occurrences of the calendar events.

9. An apparatus comprising:
   at least one processor;
   at least one memory including computer program code for one or more programs,
   at least one memory and the computer program code configured to, with the at least one processor, cause the apparatus to perform at least the following,
   determine to load a program script, involving one or more social events, into a runtime system of one or more services of the apparatus;
   determine to generate a repository of dynamic links, and to provide contextual information and/or data, relating to the social events of the program script;
   process the repository of dynamic links;
   determine, based on the program script, to update a user interface (UI) script of at least one of the services based at least in part on the processing of the dynamic links; and
   cause, at least in part, action for resulting in transmission of the modified user interface script to an application engine of the apparatus for execution of one or more resulting actions.

10. The apparatus of claim 9, wherein,
    the UI script comprises a script to direct the apparatus to play a song as a ringtone for a caller;
    the social events comprise a media service and a call service of the apparatus,
    the program script is configured to identify a song playing on the apparatus at a time of receipt of an incoming call from the caller,
    the UI script is updated to set the song as the ringtone for the caller, and
    the apparatus further comprises a media player component configured to play the song.

11. The apparatus of claim 9, further comprising: a global positioning satellite receiver circuitry configured to determine location information.

12. The apparatus of claim 11, wherein,
    the social events comprise one or more navigation functions concerning landmarks near a position of the apparatus, and
    the UI is updated to provide information regarding one or more recorded landmarks to a navigation service of the apparatus.

13. The apparatus of claim 9, wherein,
    the social events comprise one or more incoming calls on the apparatus from respective callers during a predetermined time period, and the UI is updated to send a predetermined message to the respective callers.

14. The apparatus of claim 9, wherein
the social events comprise a camera function and a device discovery function of the apparatus,
the program script is configured to generate a link among one or more other devices and image data, wherein the other devices are discovered via the discovery function at a time that the image is captured via the camera function, and
the UI is updated to display the image on the apparatus upon receipt of an incoming call from a one of the other devices.

15. A non-transitory computer-readable medium carrying one or more sequences of one or more instructions which, when executed by one or more processors, cause an apparatus to at least perform the following steps:
determining to load a program script, involving one or more social events, into a runtime system of one or more services of a device;
determining to generate a repository of dynamic links, and to provide contextual information and/or data, relating to the social events of the program script;
processing the repository of dynamic links;
determining, based on the program script, to update a user interface (UI) script of at least one of the services based at least in part on the processing of the dynamic links; and
causing, at least in part, transmission of the modified user interface script to an application engine of the apparatus for execution of one or more resulting actions.

16. The non-transitory computer-readable medium of claim 15, wherein,
the UI script comprises a script to direct the apparatus to play a song as a ringtone for a caller;
the social events comprise a media service and a call service,
the program script is configured to identify a song playing on the apparatus at a time of receipt of an incoming call from the caller, and to consider historical data about songs playing on the apparatus at respective times of receipt of incoming calls from the caller, and
the UI script is updated to set an appropriate song as the ringtone for the caller.

17. The non-transitory computer-readable medium of claim 15, wherein,
the social events comprise one or more incoming calls on the apparatus from respective callers during a predetermined time period, and
the UI is updated to send a predetermined message to the respective callers.

18. The non-transitory computer-readable medium of claim 15, wherein
the social events comprise a camera function and a device discovery function of the apparatus,
the program script is configured to generate a link among one or more other devices and image data, wherein the other devices are discovered via the discovery function at a time that the image is captured via the camera function, and
the UI is updated to display the image on the apparatus upon receipt of an incoming call from a one of the other devices.

19. The non-transitory computer-readable medium of claim 18, wherein the image comprises a picture of a recipient of the call with the caller.

20. The non-transitory computer-readable medium of claim 15, wherein
the social events comprise a reminder service for calendar events of the apparatus and a predetermined image associated with one or more of the calendar events, and
the UI is updated to display the image as a reminder for all occurrences of the calendar events.

* * * * *